March 24, 1953  O. L. DUPY  2,632,856
WATTMETRIC REGULATOR FOR PRIME MOVER DYNAMO PLANTS
Filed Dec. 10, 1949  3 Sheets-Sheet 1

OLIN L. DUPY,
INVENTOR.

BY W. E. Beatty
ATTORNEY.

March 24, 1953 — O. L. DUPY — 2,632,856
WATTMETRIC REGULATOR FOR PRIME MOVER DYNAMO PLANTS
Filed Dec. 10, 1949 — 3 Sheets-Sheet 2

OLIN L. DUPY,
INVENTOR.
BY W. E. Beatty
ATTORNEY.

OLIN L. DUPY,
INVENTOR.

BY W E Beatty

ATTORNEY.

Patented Mar. 24, 1953

2,632,856

UNITED STATES PATENT OFFICE 2,632,856

WATTMETRIC REGULATOR FOR PRIME MOVER DYNAMO PLANTS

Olin L. Dupy, Los Angeles, Calif., assignor of ten per cent to William E. Beatty, Los Angeles, Calif.

Application December 10, 1949, Serial No. 132,275

8 Claims. (Cl. 290—40)

1

The invention relates to a regulator and more particularly to an improvement in the regulator covered by my U. S. Patent No. 2,248,495 issued July 8, 1941.

In the present application as in the patent, use is made of a torque motor which not only measures the off-normal condition, but also constitutes the means whereby the generator load proportionately operates the regulating element.

In Fig. 8 of the patent, the torque motor is illustrated as a regulating element for a three-phase alternator. That circuit does not take into account an unbalanced load or the power factor in the line 114, with the result that the regulator in Fig. 8 of the patent is accurate only for balanced, noninductive loads.

An object of the present invention is to effect the regulation of one or more prime movers driving one or more electric generators viz. alternators in accordance with frequency and/or voltage and adds a correction in accordance with the actual load, that is, in accordance with the demanded watts, not the volt-amperes of the load. Any D. C. generators in the combination also add a correction in proportion to their load.

In the patent, use is made of a spring which tends to open the throttle of an engine driving the alternator while the floating field member is provided with two windings, one of which aids the spring and the other of which opposes it.

A further object of the present invention is to provide a regulator of the type described wherein the floating field member is provided with a single winding and a further object is to provide a circuit which effects the energy applied to the single winding in accordance with the watts, not the volt-amperes, in the A. C. circuit of an alternator, and/or according to the watts in the circuit of a D. C. generator.

For further details of the invention reference may be made to the drawings wherein—

Fig. 3 is a schematic representation of a plurality of single-phase alternators and a D. C. generator driven by the same engine and having the regulator of this invention.

Figure 1:
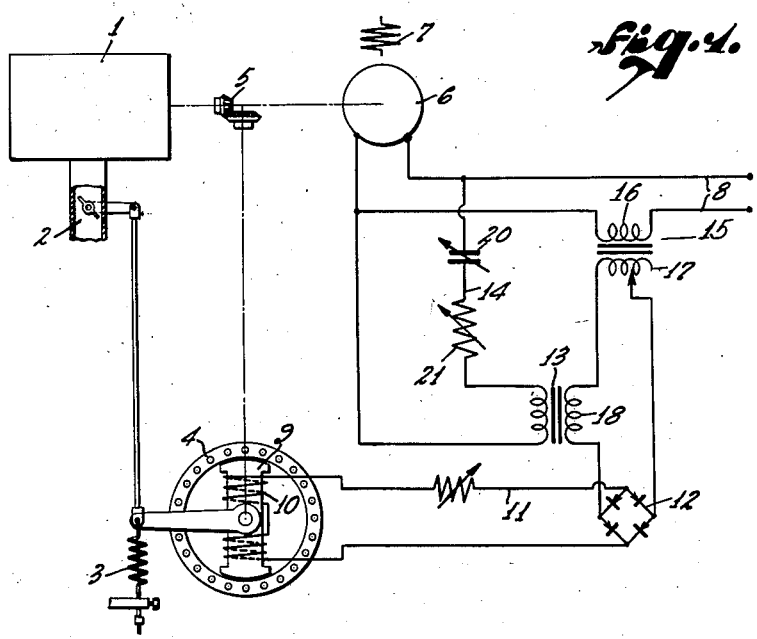
Fig. 1 is a schematic representation of an engine driven single phase alternator having the regulator of the present invention.

Referring in detail to the drawings, in Fig. 1, as in the patent, the engine 1 has a throttle 2 and spring 3 tends to open the throttle 2. The rotor 4 is constructed as described in the patent and is driven by the engine 1 in a clockwise direction through suitable gears indicated at 5. The engine 1 drives a single phase alternator 6 having a suitable field winding 7 and supplying A. C. to line 8.

In Fig. 1, the floating field member 9 has a single winding 10 energized by direct current by way of the line 11 which is connected across the rectifier 12. In the no load condition, the alternator voltage on line 8 is an indication of engine speed. This voltage produces the no load speed regulation, by way of transformer 13 and a phase shifting circuit 14, no bucking voltage due to current in line 8 being present in coil 17, with no load in line 8. Phase shift circuit 14 is adjusted to alter the phase of the voltage in the secondary of transformer 18 so that when current flows in line 8, the voltage induced in the secondary winding 17 of transformer 15 by the in-phase current in line 8 is in direct opposition to the voltage induced in the secondary of winding 18 so as to reduce the voltage energizing rectifier 12 and energizing winding 10 of floating field 9, permitting spring 3 to open throttle 2 in accordance with the true watts of electrical load. A further advantage of the phase shifting circuit 14, is that its impedance changes with frequency, viz., decreases with increasing frequency. Hence, when the speed of alternator 6 increases, both the voltage and the frequency in line 8 increase, and each thereof adds its effect in obtaining the desired regulation. The transformer 15 has a primary winding 16 in series with the line 8 and a secondary winding 17 in series with the secondary winding 18 of transformer 13 and in series with the rectifier 12.

The phase shifting circuit 14 functions by means of a condenser 20 and resistance 21, both of which are indicated as being variable although after their proper values have been computed or determined by trial, they may have fixed values.

The proper operation of the floating field 9, so that it will be responsive to the watts not volt-amperes of the load may be determined by trial. With no current in the line 8, either the tension of spring 3 or the voltage produced by winding 18 is chosen so that position of throttle 2 will be such as to produce the proper engine speed at no load. Then a watt meter not shown is inserted in the load circuit, that is, in line 8 and the resistance 21 and/or condenser 20 are adjusted so that the floating field 9 operates in proportion to the watts load in line 8, then checked against loads having various power factors. For increasing values of in-phase current in line 8 there is produced increasing values of E. M. F. of the proper phase, in winding 17 to reduce the voltage produced by winding 18 by a bucking effect and, hence, in effect, aids the spring 3 in opening the throttle 2 to take care of the increased load. Any voltage induced in winding 17 due to leading or lagging reactive current flowing in line 8 and through coil 16, will be out phase with the voltage of coil 18 and therefore ineffective in bucking this voltage. The amount of the effect on regulation caused by the load in line 8 is determined by the turn ratio of windings 17 and 18. If, for instance, 10 volts across rectifier 12 is the value of voltage that holds the throttle in the proper position for no load engine speed, then with full load in line 8 if it is found that the voltage must be reduced to 9 volts in order to open throttle 2 to the proper position for the desired engine speed, a tap is selected on winding 17 which produces the one volt necessary to oppose the voltage of winding 18 and reduce the voltage to 9 volts.

Figure 2:
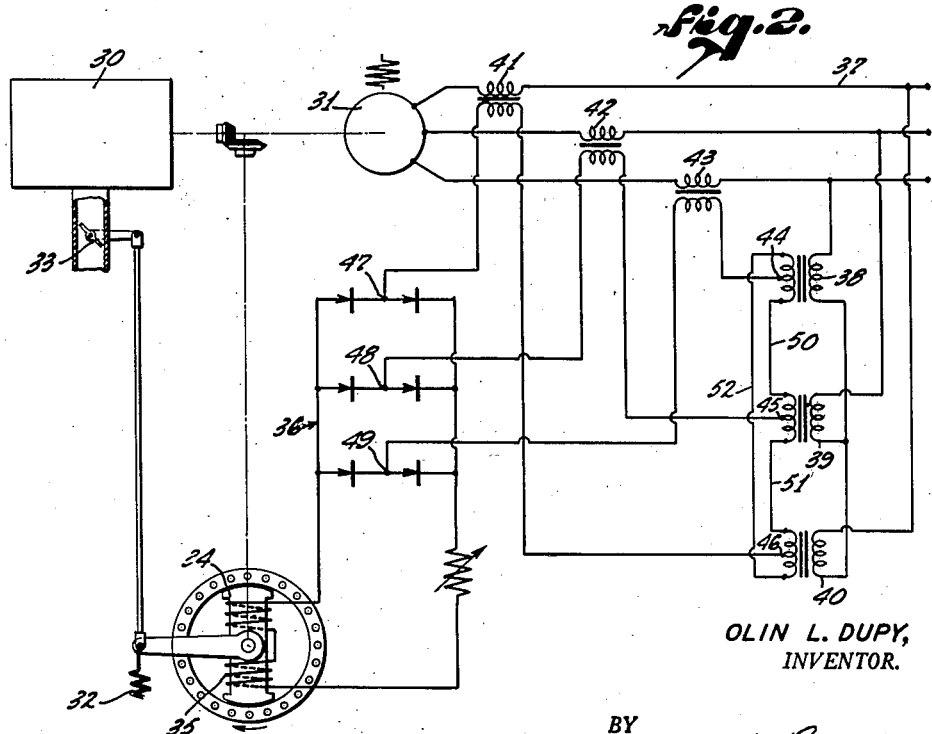
Fig. 2 is a schematic representation of an engine driven three-phase alternator having the regulator of this invention.
Figure 5:
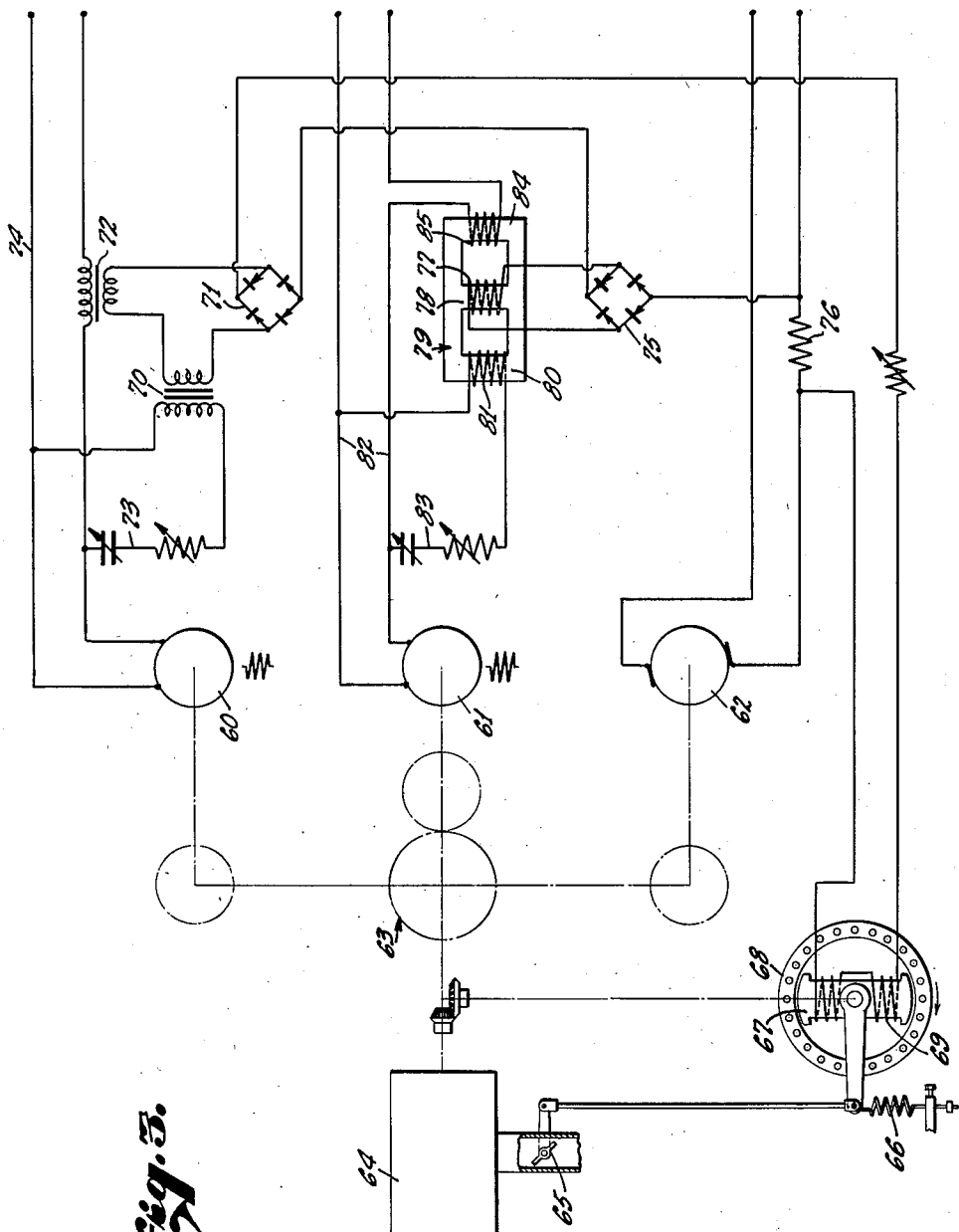

In Fig. 2, the engine 30 drives a three-phase alternator 31. As in Fig. 1, the spring 32 tends to open the throttle 33 which is operated by a floating field 34 having a single winding 35. Winding 35 is energized by a three-phase rectifier 36 which is energized by a three-phase voltage, which is the alternator voltage and therefore effects engine speed regulation, and is derived from the voltage of the three-phase line 37. Connected across the line 37 are three transformers 38, 39, 40 having their primary windings star connected across line 37 as shown. The opposing load sensing portion of the regulation is obtained from the voltage of transformers 41, 42, 43 each having a primary winding in series with one side of the line 37 as shown and each having a secondary winding connected to taps 44, 45, 46 respectively, at the secondary windings of the transformers 38, 39, 40 respectively. The other terminals of the secondary windings of transformers 41 to 43 are connected as indicated at 47, 48, 49 to the rectifier 36. The end terminals of the secondary windings of transformers 38 to 40 are connected in delta as indicated by the connections 50, 51, 52. In this circuit the necessary phase shifting is accomplished by the selection of proper points to tap onto the windings of coils 44, 45, and 46 of transformers 38, 39 and 40.

In Fig. 2, the current in the output of rectifier 36, that is in the winding 34, depends upon the difference of the voltage in transformers 38 to 40 and the voltage in transformers 41 to 43, while the tap connections 44 to 46 select the proper phase relation to insure that the bucking effect due to the current in the line 37 is effective only for loads of unitary power factor.

In Fig. 3, a single phase alternator 60, the same as illustrated in Fig. 1, and another single phase alternator 61, and a D. C. generator 62 are all driven through a suitable drive indicated at 63, by the engine 64. As in the preceding figures, engine 64 is controlled by a throttle 65 urged toward open position by a spring 66, the throttle 65 being controlled by a floating field 67 of the torque motor 68. The floating field 67 has a single winding 69, the speed sensing portion of the regulating current for the winding 69 being derived from the voltage of the alternator 60, as in Fig. 1. The voltage of alternator 60 is supplied through transformer 70 to the rectifier 71 as described and this voltage is opposed in proportion to the in-phase voltage from the current transformer 72 as above described. The phase shifter 73 in circuit with the transformer 70 insures that its voltage is effectively opposed only by in-phase current in the line 74. The rectifier 71 is connected in series with a rectifier 75 and with a resistance 76 in series with the D. C. generator 62. Rectifier 75 is energized by a coil 77 on the middle leg 78 of a transformer 79, while a second leg 80 has a coil 81 connected across the line 82 through a phase shifter 83. A third leg 84 has a coil 85 in series with the line 82. The phase shifter 83 is set or adjusted so that only the in-phase current in coil 85 will produce flux in leg 78 and voltage across rectifier 75. This can be determined as above described in connection with Fig. 1, by adjusting the phase shifter 83 so that the floating field 67 operates in proportion to the watts load. The voltage in the output of rectifier 75 as well as the voltage across resistance 76 aid the voltage across the secondary of transformer 72 in bucking the voltage across the secondary of transformer 70, to aid the spring 66 in opening throttle 65 in proportion to the load on any one or more of the machines 60, 61 and 62.

By way of example, in Fig. 3 the alternators 60 and 61 may be 120 volt, 400 cycle machines while generator 62 may be the standard D. C. unit of 28½ volts, 300 amps as used for aircraft.

In Fig. 3 the three leg transformer 79 illustrates an alternative circuit for obtaining a regulating effect proportional to watts load only of alternator 61. Also the A. C. regulating effect derived from lines 74 and 82 is rectified by the rectifiers 71 and 75 into direct currents, and therefore it is of no consequence that there may be a phase difference between the alternating currents in lines 74 and 82.

Figure 4:
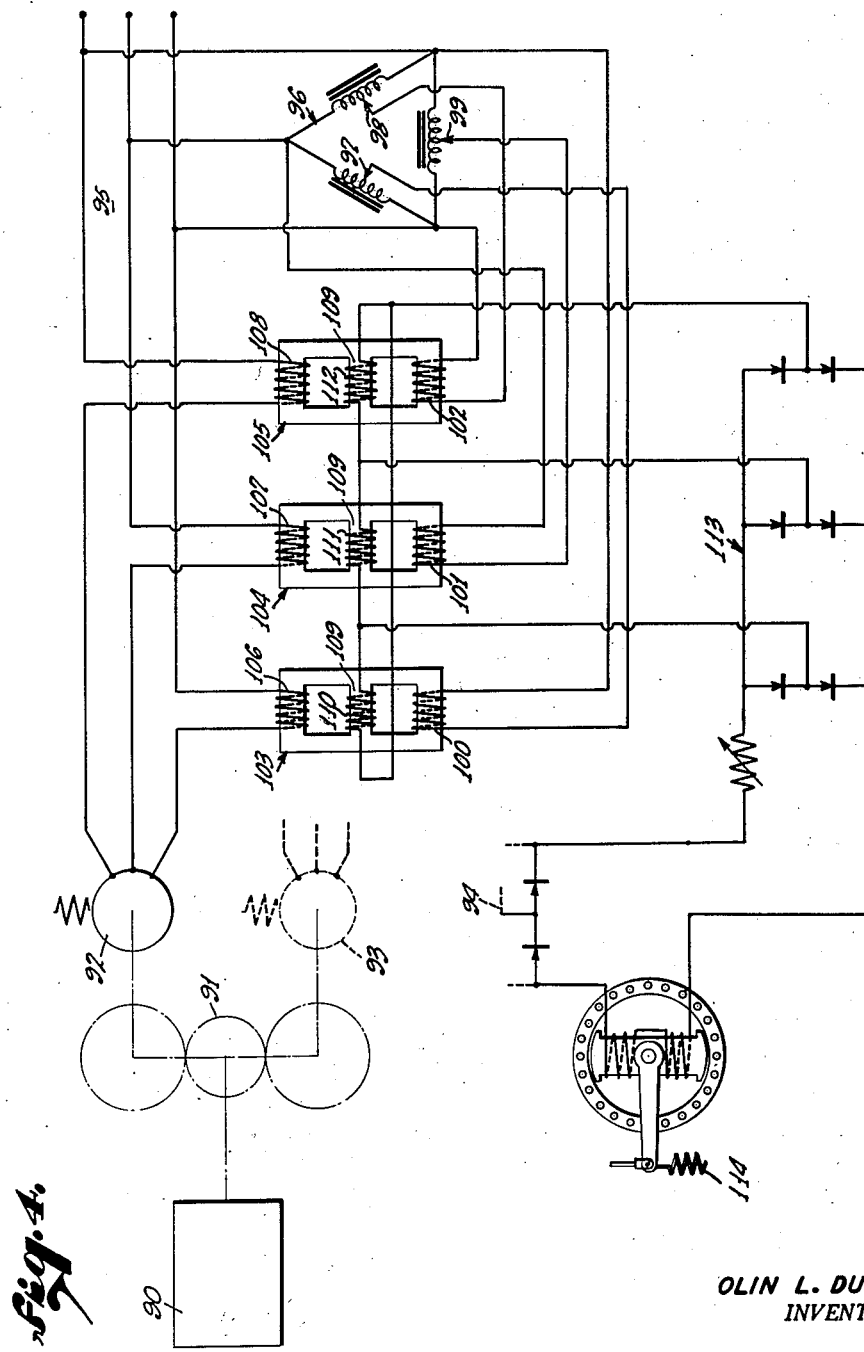
Fig. 4 is a schematic representation of a plurality of three-phase alternators driven by the same engine and having the regulator of this invention, the dotted line showing of the lower three-phase alternator and the dotted line connection to the rectifier therebelow representing the alternator rectifier circuit of Fig. 2.

Referring to Fig. 4, the engine 90 through suitable gearing 91 drives a three-phase alternator 92 and a three-phase alternator 93, the latter and its regulating circuit to the rectifier 94 being the same as the alternator 31 and its circuit to the rectifier 36 as in Fig. 2. For the alternator 92 in Fig. 4 I have illustrated a different circuit for effecting regulation only in proportion to the in-phase load current. For this purpose, across the line 95 is connected a delta arrangement of reactances indicated at 96, with a tap indicated at 97, 98, 99 for adjusting the connection to the coils 100, 101, 102 respectively on the three leg transformers 103, 104 and 105. Another leg of each transformer 103 to 105 has a coil as indicated at 106, 107, 108 in series with one side of the line 95. Each of the transformers 103 to 105 has a middle leg like 109 having a coil thereon like 110, the other similar coils being indicated at 111 and 112. The coils 110 to 112 are delta connected to the three-phase rectifier 113. As in Fig. 3, the taps 97 to 99 are adjusted so that only the in-phase current in coils 103 to 105 will produce flux in the coils 110 to 112. Hence, the voltage supplied by coils 110 to 112 to rectifier 113 also depends only on the in-phase current in the line 95. Rectifier 113 thus supplies a D. C. voltage in proportion to the voltage across line 95 altered in proportion to the in-phase current in line 95 and rectifier 94 supplies a D. C. voltage in proportion to the voltage across line 37 altered in proportion to the in-phase current in line 37 in Fig. 2. As in Fig. 2, the major portion of the regulation depends on the voltage of the alternator 31 in Fig. 2, while a load sensing portion depends on the load on both of the alternators 92, 93. The D. C. voltage across rectifier 113 assists the D. C. voltage across rectifier 94 in affecting the torque of the regulator, permitting the spring 114 to open the throttle in accordance with the load on alternator 92.

Various modifications may be made in the invention without departing from the spirit of the following claims.

I claim:

1. The combination of a prime mover, an alternator driven thereby, a regulator for said prime mover, said regulator comprising a torque motor having a rotor and a floating field member, a winding for said field member, a rectifier for supplying said winding with direct current, means for energizing said rectifier with a voltage of a certain value dependent on the voltage of said alternator, means for energizing said rectifier with an opposing voltage of a value dependent on current load on said alternator, and a phase shifter for relatively shifting the phase of said voltages into opposition only for in-phase load current of said alternator.

2. The combination according to claim 1 wherein said phase shifter has an impedance which changes with frequency.

3. A regulator comprising a torque motor type of regulator for controlling the throttle of an engine driven alternator, said torque motor having a rotor having a driving connection with said engine and a floating field member having a winding and a spring tending to open said throttle, a rectifier in circuit with said winding, a current transformer having a winding in series with said alternator, a voltage transformer having a winding across said alternator and means for energizing said rectifier from said windings with voltages which are in opposition only for substantially unitary power factor of the load of said alternator, the voltage from said current transformer aiding said spring.

4. A regulator comprising a torque motor type of regulator according to claim 3 wherein the voltage from said voltage transformer is substantially larger than the voltage from said current transformer.

5. A regulator comprising a torque motor type of regulator for controlling the throttle of an engine driven alternator, said torque motor having a rotor having a driving connection with said engine and a floating field member having a winding and a spring tending to open said throttle, a rectifier in circuit with said winding, means for energizing said rectifier in accordance with the voltage of said alternator, and means for reducing the effect of said energizing means and aiding said spring in accordance with the in-phase current load of said alternator.

6. The combination of a prime mover having a throttle, a generator driven by said prime mover, a regulator for said prime mover, said regulator comprising a torque motor having a rotor having a driving connection with said prime mover and having a floating field member having a winding and a spring tending to open said throttle, a circuit for supplying to said winding a regulating voltage according to the voltage of said generator, and a circuit for bucking said regulating voltage in accordance with the load of said generator.

7. A regulator comprising a torque motor type of regulator for controlling the throttle of an engine driven alternator, said torque motor having a rotor having a driving connection with said engine and a floating field member having a winding opposing a spring tending to open said throttle, a rectifier in circuit with said winding, means for energizing said rectifier to a major extent in accordance with the voltage of said alternator, means for correcting the effect of said energizing means and aiding said spring to a minor extent in accordance with the in-phase current load of said alternator, and means for neutralizing the effect of out-of-phase current load of said alternator on said correcting means.

8. The method of regulating the throttle of an engine driving an alternator, said method comprising regulating said throttle to a major extent in accordance with the voltage of said alternator, correcting said voltage regulation to a minor extent in accordance with the in-phase current load of said alternator, and neutralizing the effect of out-of-phase current load of said alternator on said correction.

OLIN L. DUPY.

REFERENCES CITED

The following references are of record in the file of this patent:

UNITED STATES PATENTS

| Number | Name | Date |
|---|---|---|
| 1,533,356 | Todd | Apr. 14, 1925 |
| 1,586,533 | Peterson | June 1, 1926 |
| 1,675,477 | Wilson | July 3, 1928 |
| 2,015,556 | Fountain | Sept. 24, 1935 |
| 2,095,120 | Belfils et al. | Oct. 5, 1937 |
| 2,248,495 | Dupy | July 8, 1941 |
| 2,298,977 | Silber et al. | Oct. 13, 1942 |
| 2,305,952 | Cravath | Dec. 22, 1942 |
| 2,472,571 | Crary | June 7, 1949 |
| 2,486,068 | Shishini et al. | Oct. 25, 1949 |